United States Patent Office 3,051,755
Patented Aug. 28, 1962

3,051,755
PROCESS FOR THE DRYING OF GASEOUS
FORMALDEHYDE
Otto Schweitzer, Konigstein (Taunus), and Jürgen Behrends, Hanau (Main), Germany, assignors to Deutsche Gold- und Silber-Scheideanstalt vormals Roessler, Frankfurt am Main, Germany
No Drawing. Filed Jan. 4, 1960, Ser. No. 81
Claims priority, application Germany Jan. 7, 1959
4 Claims. (Cl. 260—606)

The present invention relates to an improved process for the drying of monomeric gaseous formaldehyde.

The object of the present invention is to provide a novel process for preparing dry monomeric gaseous formaldehyde.

Another object of this invention is to provide for the simultaneous recovery of oligomeric formaldehyde formed during the drying process.

In many commercial chemical processes, in which monomeric, gaseous formaldehyde is used as a reactant, it is necessary to use the formaldehyde in a dry form. It is known to the art that gaseous formaldehyde can be extensively relieved of moisture by freezing it out. However, during this freezing out drying process oligomeric forms of formaldehyde are continuously being formed. Because of this simultaneous formation of the oligomeric formaldehydes, in a good many cases, the drying effect is also lowered. The use of a dry formaldehyde, though, is particularly important in the production of polymers of formaldehyde. Attempts have also been made to dry formaldehyde with silica gel. The products of this process however were not dried very extensively.

It has now been found, according to this invention that it is possible to dry monomeric, gaseous formaldehyde with good results and to simultaneously recover the oligomeric formaldehydes that are formed if the gaseous formaldehyde is treated with an aluminum silicate gel drying agent which is mechanically or pneumatically agitated during the course of the drying operation.

The aluminum silicate gels which can be used in the process of this invention are, per se, known to the art. A very high degree of dryness, however, is unexpectedly obtained in the formaldehyde gas with this process. The oligomeric formaldehydes that are formed are deposited on the aluminum silicate gel and can be easily separated and recovered from the gel by mechanical or pneumatic techniques so that the drying process of this invention can also be conducted on a continuous basis with good results.

The particle size of the aluminum silicate gel used in the process of this invention can vary within a wide range of values. When using a fine particle sized aluminum silicate gel, however, it is advantageous to agitate the gel with commonly employed pneumatic means and techniques. Among these, for example, are aspirators and fluidized bed techniques.

However, it is generally more advantageous to use a coarse grain sized gel, since then, the results produced by the process of this invention can be obtained by means of simple mechanical techniques such as by sieving, shaking, agitating, vibrating or the like. It is of particular advantage, however, to use an aluminum silicate gel, the particle size of which has an approximately spherical or granular shape, because the oligomeric formaldehydes are very easily separated from this type gel form with mechanical techniques.

For the purposes of this invention it is expedient that the gel be used in the form of relatively uniformly sized particles, the average diameter of which is about 3.5 mm. The range in size is preferably between 1 and 5 mm.

It has also been found according to this invention that the best results can be obtained if the treatment of the formaldehyde is conducted with a pure aluminum silicate which contains a larger portion of silicic acid. Gas drying mediums of this type are known per se, and generally have a spherical shape. Their average diameter, for example, is about 3.5 mm., their apparent density is about 0.8 g./cm.$^3$, their specific heat is about 0.25 kcal./kg./° C., their specific surface area is more than 650 m.$^2$/g. and the specific surface area of a single droplet averages 20 m.$^2$. The $SiO_2$ content of these aluminum silicate gel particles, which is chemically bonded, is about 80 to 90%. It is an aluminum silicate gel which contains more than the stoichiometric amount of $SiO_2$.

It was unexpectedly found, that, when gels of this type are used in the process of this invention, only a relatively small portion of the oligomeric formaldehydes form on the surface of the gel and the drying action of the gel is only insignificantly effected thereby.

The process of this invention can be so conducted, for example, that the formaldehyde gas is conducted through an ordinary sieved bottom drying tower which contains the gel. With this type device, for example, the gel can be agitated mechanically during the drying operation. Any oligomeric formaldehyde that forms during the drying operation will thereby be shaken off the gel by the mechanical agitation and will fall out the bottom of the drying tower through the sieved bottom. During the drying operation it is advantageous to maintain a cool temperature of −70 to +65° C. within the drying tower.

The formaldehyde gas dried by the process of this invention can be used with good results for all the well known formaldehyde polymerization processes, particularly in those which must be carried out in the most complete absence of water as possible. To this class of reactions there belongs, in particular, any process in which the monomeric formaldehyde is polymerized in an inert liquid medium in the presence of a polymerization catalyst.

The manner in which the monomeric formaldehyde gas may have been produced has no bearing on its subsequent use in the drying process of this invention.

The following examples are illustrative of the process of this invention but are not intended as a limitation upon its scope.

*Example 1*

A water cooled column 80 cm. high and 3 cm. in diameter was externally mounted on a reaction vessel in which were placed 200 g. of paraformaldehyde and 300 ml. of paraffin oil. The column contained a 5 cm. high layer of glass Raschig rings and was filled to the top with a loosely packed charge of commercially available aluminum silicate gel (trademark KC-Trockenperlen (drying beads)). This gel contained 86.12% $SiO_2$, the difference to 100% consisted of alumina. The reaction vessel was maintained at 15° C. and a continuous stream of crude formaldehyde gas, which was thereby produced, passed up through the drying column in which small amounts of oligomeric formaldehyde were deposited on the drying gel and which in turn were separated from the gel by a continuous agitation thereof during the drying operation. The agitation of the gel was accomplished mechanically with the aid of a vibrator. The monomeric formaldehyde gas emanating from the top of the column was highly purified. During the drying operation the interior of the column was maintained at a temperature of about 10 to about 15° C. Hardly any deposit accumulated in the glass tubing used for conducting the gases away from the head of the glass column.

The gel used had a particle size of 3.5±0.5 mm.

The gas thus produced had a purity of 99.99% and contained 0.01% moisture. The yield was 80% based on the introduced formaldehyde.

The highly purified monomeric formaldehyde gas produced in this manner was used for the production of eupolyoxymethylenes without being purified any further.

*Example 2*

Example 1 was repeated with the difference that the temperature within the column was maintained at 20 to 40° C. The gas had a purity of 99.99% and contained 0.01% moisture.

*Example 3*

As for comparison Example 1 was repeated with the difference that instead of the aluminum silicate gel a pure silica gel ($SiO_2$) was used. The amounts of oligomeric formaldehyde were 60% based on the introduced formaldehyde. The gases which reached the head of the column could not be used for the production of eupolyoxymethylenes.

*Example 4*

Example 1 was repeated with the difference that instead of the aluminum silicate gel pure $Al_2O_3$ was used in form of 7/32″ pellets. The column became obstructed within a short time by oligomeric formaldehyde. The drying of the gas was impossible.

Oligomeric formaldehyde is formed by the prior art processes in an amount of more than 30%. It has been surprising that according to this invention the amounts of oligomers only reach 50 to 20%.

The efficiency of the process according to this invention does not decrease when the drying agent has been regenerated several times by heating to about 200° C. This means that the efficiency is constant over a long period of time. Therefore, this process is specially suited when it is carried out continuously.

We claim:

1. A process for drying moist monomeric gaseous formaldehyde which comprises treating said monomeric gaseous formaldehyde with an agitated aluminum silicate gel essentially composed of 80 to 90% of silicic acid and the remainder alumina at a temperature between −70 to +65° C. and recovering the resulting dried monomeric gaseous formaldehyde.

2. A process as in claim 1 in which said gel is in coarse granular form.

3. A process as in claim 2 in which said gel granules have a diameter of 3.5±0.5 mm.

4. A process as in claim 2 in which said gel granules are approximately spheroid in shape and relatively uniform in size.

References Cited in the file of this patent

UNITED STATES PATENTS

| | | |
|---|---|---|
| 2,768,994 | MacDonald | Oct. 30, 1956 |
| 2,841,570 | MacDonald | July 1, 1958 |

FOREIGN PATENTS

| | | |
|---|---|---|
| 467,405 | Canada | Aug. 15, 1950 |
| 518,210 | Canada | Nov. 8, 1955 |
| 814,119 | Great Britain | May 27, 1959 |